(12) United States Patent
Perlman et al.

(10) Patent No.: US 7,309,089 B2
(45) Date of Patent: Dec. 18, 2007

(54) VACUUM CUP

(75) Inventors: Maurice Perlman, Oak Park, MI (US); Keith S Attee, Charlevoix, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 11/034,046

(22) Filed: Jan. 12, 2005

(65) Prior Publication Data

US 2005/0168001 A1    Aug. 4, 2005

Related U.S. Application Data

(60) Provisional application No. 60/541,636, filed on Feb. 4, 2004.

(51) Int. Cl.
*B25J 15/06* (2006.01)
(52) U.S. Cl. .................................... 294/64.1
(58) Field of Classification Search ............... 294/64.1, 294/64.2, 64.3
See application file for complete search history.

(56) References Cited

U.S. PATENT DOCUMENTS

| | | | |
|---|---|---|---|
| 1,228,690 A | | 6/1917 | Monnet |
| 2,523,157 A | * | 9/1950 | Somma ..................... 294/64.1 |
| 2,850,279 A | | 9/1958 | Stoothoff et al. |
| 3,033,298 A | * | 5/1962 | Johnson ....................... 248/363 |
| 3,152,828 A | * | 10/1964 | Lytle ........................ 294/64.1 |
| 3,223,442 A | | 12/1965 | Fawdry et al. |
| 3,272,549 A | * | 9/1966 | Nisula ........................ 294/64.1 |
| 3,568,959 A | | 3/1971 | Blatt |
| 3,613,904 A | | 10/1971 | Blatt |
| 3,694,894 A | * | 10/1972 | Jelinek et al. ............. 294/64.1 |
| 3,901,502 A | | 8/1975 | Vits |
| 3,957,296 A | | 5/1976 | Langguth |
| 3,970,341 A | | 7/1976 | Glanemann et al. |

(Continued)

FOREIGN PATENT DOCUMENTS

DE    3516941    * 11/1986

(Continued)

OTHER PUBLICATIONS

Kalthoff, Web Holding Device, Oct. 1980, vol. 23, No. 5, pp. 1-2 and Figs. 1 and 2.*

*Primary Examiner*—Peter M. Cuomo
*Assistant Examiner*—Paul T Chin
(74) *Attorney, Agent, or Firm*—Van Dyke, Gardner, Linn & Burkhart LLP

(57) ABSTRACT

A vacuum cup for a material handling system includes a body portion and a perimeter seal that functions to substantially seal against an object. The vacuum cup may transport the object when a partial vacuum is applied to the vacuum cup to retain the cup to the object. The vacuum cup includes a relief port and sealing member that function to at least partially relieve the vacuum from the vacuum cup to allow the vacuum cup to be detached from the object with a reduced force, even while the vacuum is applied. The sealing member may engage a surface of the object to close the relief port. When the vacuum cup is initially pulled or moved away from the object, the sealing member is at least partially separated from the object and allows the cavity to be vented to at least partially relieve the vacuum within the cavity.

31 Claims, 3 Drawing Sheets

U.S. PATENT DOCUMENTS

| | | | |
|---|---|---|---|
| 4,006,929 A * | 2/1977 | Barker ..................... 294/64.1 |
| 4,121,865 A | 10/1978 | Littwin, Sr. |
| 4,129,328 A | 12/1978 | Littell |
| 4,266,905 A | 5/1981 | Birk et al. |
| 4,451,197 A | 5/1984 | Lange |
| 4,453,755 A | 6/1984 | Blatt et al. |
| 4,548,396 A | 10/1985 | Nelen |
| 4,600,228 A | 7/1986 | Tarbuck |
| 4,662,668 A * | 5/1987 | Hufford ..................... 294/64.1 |
| 4,708,381 A * | 11/1987 | Lundback ................. 294/64.1 |
| 4,747,634 A | 5/1988 | Hoke |
| 4,762,354 A * | 8/1988 | Gfeller et al. ................. 294/2 |
| 5,029,383 A | 7/1991 | Snyder et al. |
| 5,172,922 A | 12/1992 | Kowaleski et al. |
| 5,222,854 A | 6/1993 | Blatt et al. |
| 5,345,935 A * | 9/1994 | Hirsch et al. ............... 600/376 |
| 5,609,377 A | 3/1997 | Tanaka |
| 6,318,433 B1 * | 11/2001 | Reis et al. .................... 269/21 |
| 6,437,560 B1 * | 8/2002 | Kalb ....................... 414/752.1 |
| 6,454,333 B2 | 9/2002 | Portal |
| 6,502,877 B2 | 1/2003 | Schick et al. |

FOREIGN PATENT DOCUMENTS

| | | | |
|---|---|---|---|
| FR | 2547289 | * 12/1984 | ................ 294/64.1 |
| JP | 46-24328 | * 7/1971 | ................ 294/64.1 |
| JP | 406143176 | * 5/1994 | ................ 294/64.1 |

* cited by examiner

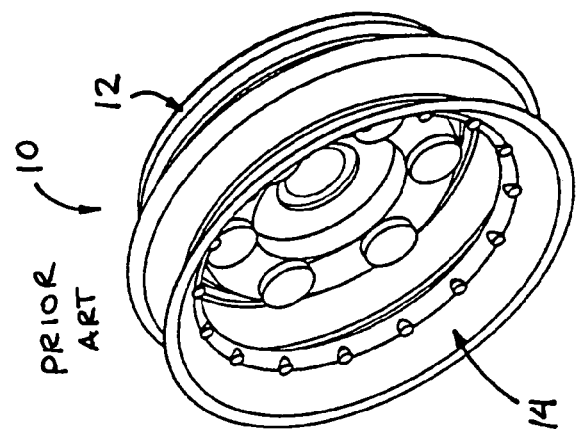
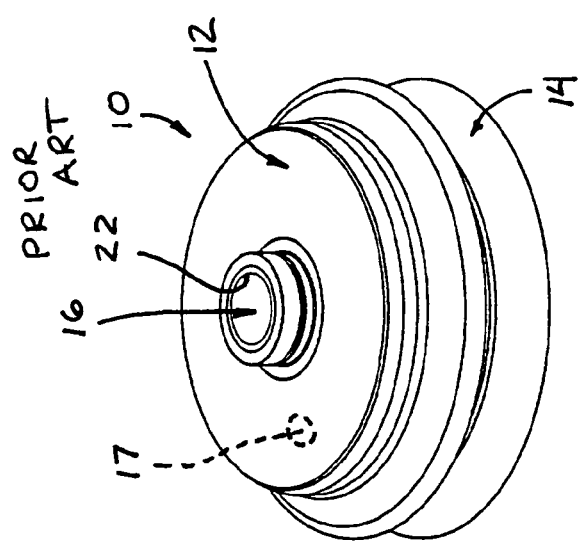
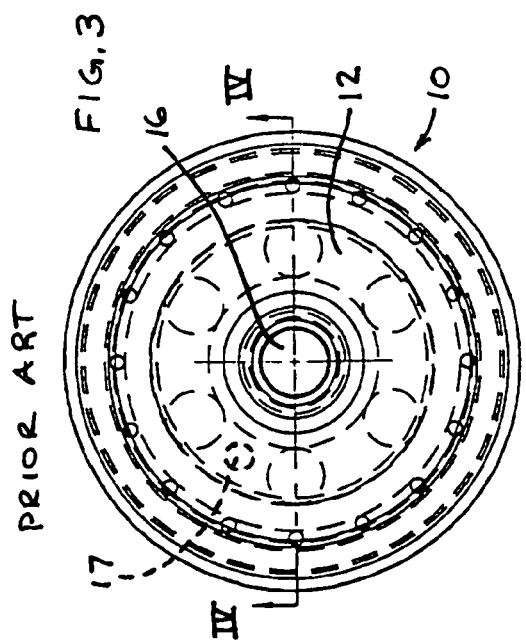
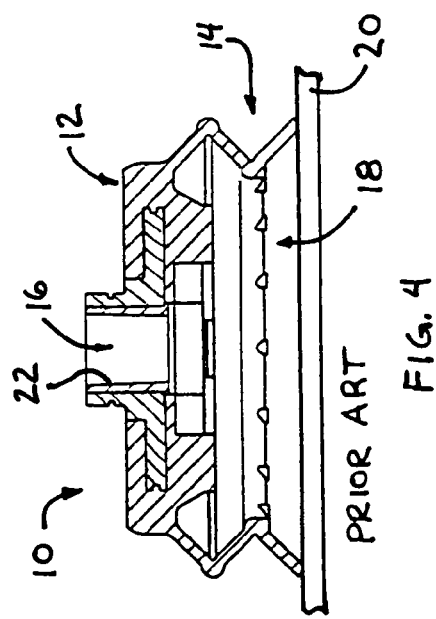

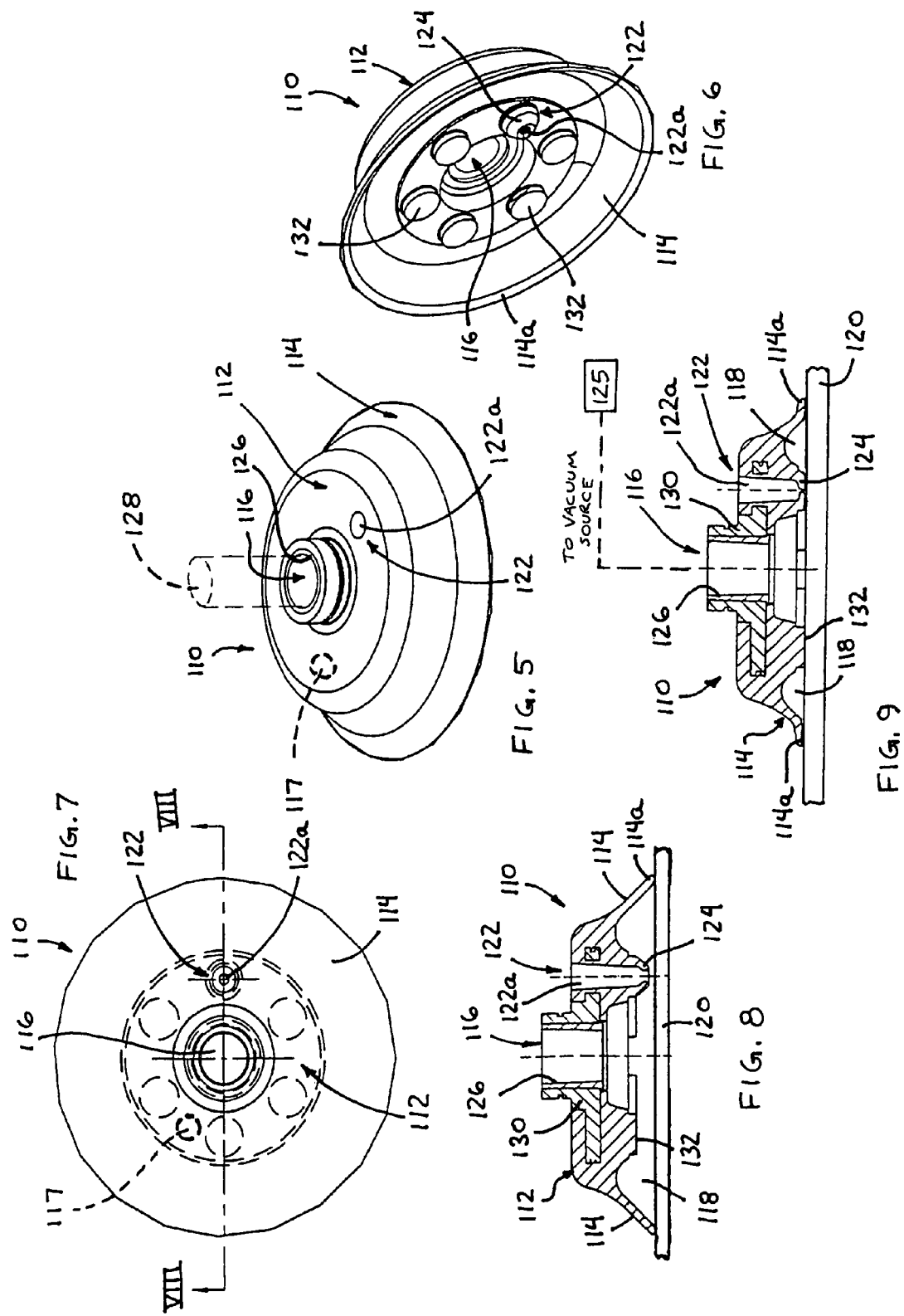

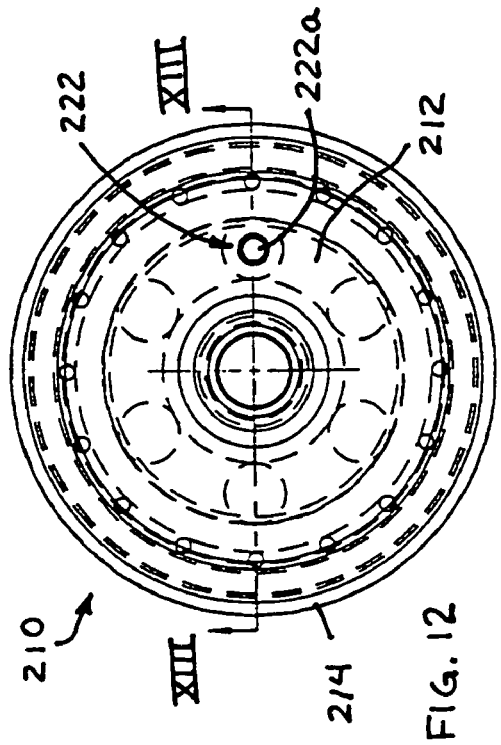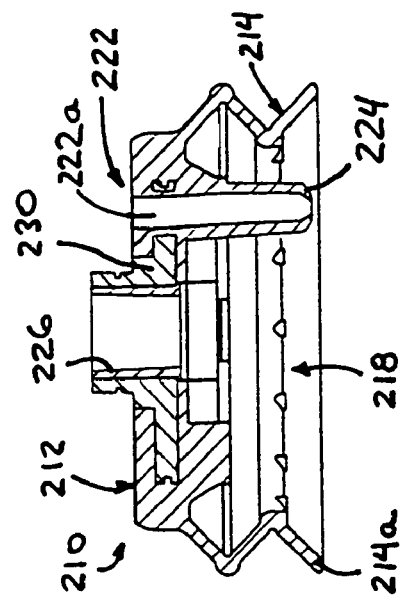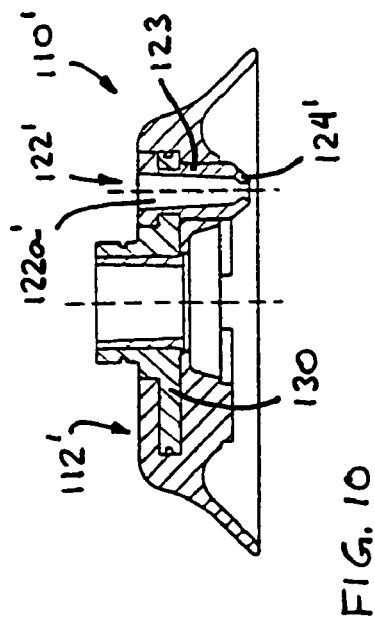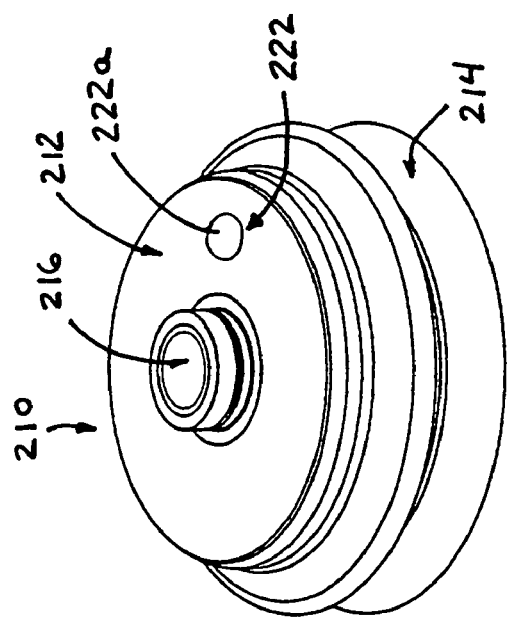

VACUUM CUP

CROSS REFERENCE TO RELATED APPLICATION

The present application claims the benefit of U.S. provisional application Ser. No. 60/541,636, filed Feb. 4, 2004, which is hereby incorporated herein by reference in its entirety.

FIELD OF THE INVENTION

The present invention relates generally to material handling systems and, more particularly, to material handling systems that handle objects via vacuum cups or suction cups engaged with the objects and substantially sealed thereto.

BACKGROUND OF THE INVENTION

It is known to provide material handling systems that include vacuum cups or the like that are adapted to be engaged with an object, such as a substantially flat object or panel or the like, and to lift and move the object to a desired location. Such vacuum cups or suction cups may be moved into engagement with the object, and a vacuum source may be actuated to create a vacuum between the object and the cup such that the object is retained to the cup as it is transported to the targeted area. An example of such a vacuum cup is disclosed in U.S. Pat. No. 4,662,668, which is hereby incorporated herein by reference.

As shown in FIGS. 1-4, a typical bellows-type vacuum cup 10 may include a body portion or back panel portion 12 and a bellows-type or pleated skirt or seal 14 extending from body portion 12. The body portion may include a vacuum port or opening or aperture 16 therethrough for receiving or connecting to a vacuum source to draw air out of a cavity 18 defined between the vacuum cup and an object 20. The bellows-type pleated skirt 14 may comprise a flexible, resilient, elastomeric material or the like, and may flex to engage the object 20 and to provide a substantially airtight seal between the vacuum cup 10 and the object 20. The vacuum cup 10 may further include a bushing or fitting or the like 22, such as a threaded brass fitting or bushing, for connection to the vacuum source. Optionally, the bushing or fitting may be adapted or configured to connect to a proximity sensor (not shown), such as to a threaded end of a proximity sensor of the type described in U.S. Pat. No. 4,662,668. The sensor may detect the presence of an object, such as the object 20 in FIG. 4, that is at or proximate to the sensor. In such an application with an object sensor at the central port or opening of the vacuum cup, the vacuum cup may include a separate vacuum port (such as shown in phantom at 17 in FIGS. 1 and 3) for connection to the vacuum source.

The vacuum source is operable to draw air through the vacuum port and out of the cavity to create a partial vacuum between the vacuum cup and the object. Often, the vacuum source remains operational to maintain the partial vacuum between the object and the vacuum cup to retain the object on the vacuum cup throughout transportation of the object from one location to the other. When the vacuum cup and object arrive at the targeted location, the vacuum cup may be pulled away from the object, while the object is substantially retained in a particular location, such that the object is stripped from the vacuum cup, all while the vacuum source remains operational to create/maintain the vacuum.

For example, vacuum cups often may engage and substantially seal against objects, and may carry the objects to a magnetic belt or conveyor that is positioned above the objects. In such applications, the vacuum cups may lift or raise the object up to the overhead or raised magnetic conveyor and may release the article at the overhead conveyor. Typically, the vacuum cups are pulled upwardly until the panel or object engages the magnetic conveyor. The vacuum cups are then pulled further upwardly (while the panel or object is retained at the magnetic conveyor) to strip or dislodge the cups from the panel or object, whereby the object is retained on the magnetic conveyor via the magnetic attraction between the metallic object and the magnetic conveyor.

The entire process of engaging the object, lifting the object upward to the magnetic conveyor and stripping the cups off of the object at the conveyor is typically performed with the vacuum source activated, such that the vacuum source creates the partial vacuum at the vacuum cup and does not release the vacuum to assist in releasing the cup from the object or panel. The vacuum source may remain operational throughout this process to avoid having to activate and deactivate the vacuum source multiple times while moving multiple objects from one location to the next. However, the pulling of the vacuum cup or cups from the object while the vacuum is applied between the vacuum cup and the object may cause excessive wear to the vacuum cups and, thus, may lead to premature failure of the vacuum cups over time.

SUMMARY OF THE INVENTION

The present invention provides a vacuum cup for a material handling system that is configured to automatically at least partially relieve or release or vent the vacuum or partial vacuum between the vacuum cup and an attached object as the vacuum cup is pulled from the object. Because the vacuum between the vacuum cup and the object is at least partially relieved when the vacuum cup is initially pulled, the vacuum cup may then be removed from the object with a reduced amount of force and stress on the vacuum cup and, thus, will reduce the wear on the vacuum cup and prolong the life cycle of the vacuum cup. The relief port. may partially relieve the vacuum and the vacuum cup may be removed with reduced stress while the partial vacuum (such as from a vacuum source) is still applied to the vacuum cup or after the vacuum source is deactivated or disconnected from the vacuum cup, without affecting the scope of the present invention.

According to an aspect of the present invention, a vacuum cup for picking up an object includes a body portion, a flexible perimeter seal extending from the body portion, and a relief port defined through the body portion. The perimeter seal engages an object and substantially seals to the object when the perimeter seal contacts or is engaged with the object. The vacuum cup is retained against the object via a partial vacuum that is created within a cavity defined between the body portion, the perimeter seal and the object. The relief port has a sealing member for at least substantially closing the relief port when the perimeter seal contacts or is sufficiently engaged with the object, such as when the vacuum is applied. The sealing member at least partially opens the relief port when the vacuum cup is moved or pulled a sufficient amount in a direction generally away from the object and/or the object is moved or pulled a sufficient amount in a direction generally away from the vacuum cup. The relief port at least partially or substantially relieves the vacuum when the relief port is at least partially open, such that the perimeter seal may release from the object with a reduced stress or force over that needed for conventional vacuum cups. As the relief port is at least partially opened, the vacuum cup may be stripped or pulled or otherwise removed from the object via any known manner.

According to another aspect of the present invention, a material handling system for engaging and picking up objects includes a vacuum source and a vacuum cup for sealing to an object to pick up the object. The vacuum cup and the object define a cavity therebetween when the vacuum cup is engaged with the object. The vacuum cup includes a body portion, a flexible perimeter seal extending from the body portion and a relief port defined through the body portion. The vacuum cup is connected to the vacuum source. The perimeter seal substantially seals to the object when the perimeter seal engages the object and when the vacuum source is activated. The body portion and the perimeter seal define the cavity at the object when the perimeter seal is engaged with the object. The relief port has a sealing member for engaging the object when the perimeter seal is engaged with the object. The sealing member at least substantially closes the relief port when the sealing member is engaged with the object. The vacuum source is connected to the vacuum cup and is operable to draw air out of the cavity to create a partial vacuum in the cavity when the sealing member and the perimeter seal are engaged with the object. The sealing member at least partially disengages from the object when the vacuum cup is pulled or moved in a direction generally away from the object and/or when the object is pulled or moved in a direction generally away from the vacuum cup. The relief port at least partially relieves the vacuum when the sealing member is disengaged from the object such that the perimeter seal may release from the object with reduced stress or force over that needed for conventional vacuum cups. This may be done with the vacuum source still activated and connected to the vacuum cup (or with the partial vacuum otherwise applied to the vacuum cup) or with the vacuum source deactivated or disconnected from the vacuum cup, without affecting the scope of the present invention.

According to another aspect of the present invention, a method for engaging and picking up objects and transporting the objects to a targeted location and disengaging the objects at the targeted location includes providing a vacuum cup having a body portion, a flexible perimeter seal extending from the body portion, and a relief port with a sealing member that is adapted to open and close the relief port. The vacuum cup is moved toward and into engagement with an object to substantially seal the perimeter seal of the vacuum cup and the sealing member of the relief port at the object. The perimeter seal, the body portion and the object define a cavity. The object is transported to the targeted location while the perimeter seal and the sealing member are substantially sealed against the object. The vacuum cup is pulled or moved a sufficient amount in a direction generally away from the object (and/or the object is pulled or moved a sufficient amount in a direction generally away from the vacuum cup) at the targeted location to at least partially disengage the sealing member from the object to at least partially vent the cavity of the vacuum cup. The vacuum cup is removed from the object when or after the cavity is at least partially vented by the relief port.

Therefore, the present invention provides a vacuum cup for a material handling assembly or system that includes an automatic release mechanism or relief valve for at least partially relieving or venting the vacuum in a vacuum cup to assist in releasing the object from the vacuum cup, even while the vacuum source may still be operational to draw air out of the cavity defined by the vacuum cup. The vacuum cup of the present invention thus provides a means for reducing the stress on the vacuum cup during the process of releasing an object from the vacuum cup and, thus, provides enhanced performance of the vacuum cup with reduced wear on the vacuum cup. The vacuum cup of the present invention thus provides a longer life cycle over vacuum cups of the prior art, where an object is stripped from the vacuum cup while the cup is fully sealed to the object and with the substantial or full vacuum within the cavity of the vacuum cup, which likely will damage the perimeter seal and sidewalls of conventional vacuum cups over time.

These and other objects, advantages, purposes and features of the present invention will become apparent upon review of the following specification in conjunction with the drawings.

BRIEF DESCRIPTION OF THE DRAWINGS

FIG. 1 is a perspective view of a known bellows-type vacuum cup;

FIG. 2 is a perspective view of the underside of the vacuum cup of FIG. 1;

FIG. 3 is a top plan view of the vacuum cup of FIGS. 1 and 2;

FIG. 4 is a sectional view of the vacuum cup taken along the line IV-IV in FIG. 3;

FIG. 5 is a perspective view of a vacuum cup in accordance with the present invention;

FIG. 6 is a perspective view of the underside of the vacuum cup of FIG. 5;

FIG. 7 is a top plan view of the vacuum cup of FIGS. 5 and 6;

FIG. 8 is a sectional view of the vacuum cup taken along the line VIII-VIII in FIG. 7;

FIG. 9 is a sectional view similar to FIG. 8, with the vacuum cup substantially engaged with an object;

FIG. 10 is a sectional view similar to FIG. 8, showing another vacuum cup in accordance with the present invention;

FIG. 11 is a perspective view of another vacuum cup in accordance with the present invention;

FIG. 12 is a top plan view of the vacuum cup of FIG. 11; and

FIG. 13 is a sectional view of the vacuum cup taken along the line XIII-XIII in FIG. 12.

DESCRIPTION OF THE PREFERRED EMBODIMENTS

Referring now to the drawings and the illustrative embodiments depicted therein, a vacuum cup 110 for a material handling device or system includes a body portion 112 and a perimeter seal portion 114 (FIGS. 5-9). Vacuum cup 110 includes a vacuum port 116 for drawing air out of a cavity 118 defined by the body portion 112 and perimeter seal 114 and an object 120 (FIGS. 8 and 9) engaged with the perimeter seal 114. Vacuum cup 110 further includes a relief port 122, which defines a passageway 122a through body portion 112 and which includes an inner seal or sealing member or valve 124 that functions to open and close passageway 122a of relief port 122 when inner seal 124 is moved away from and into engagement with the object 120, respectively, as discussed below. Vacuum cup 110 may be connected to a vacuum source 125 (FIG. 9) which may be operable to draw air from cavity 118 through vacuum port 116 to at least partially evacuate the air from the cavity and create a partial or substantial vacuum in cavity 118, so as to substantially seal and retain object 120 to vacuum cup 110, as discussed below. The vacuum cup or vacuum cups may be mounted to a support assembly that is movable to move the cups into engagement with an object and to pick up and transfer or move the object to a targeted destination, such as is known in the material handling arts.

The vacuum source may be in fluid communication with vacuum port 116 and may be connected through a tube or another port in a mounting block or adapter or the like (not shown) attached to vacuum cup 110. In the illustrated embodiment, vacuum port 116 is a centrally located opening through body portion 112. Vacuum cup 110 may further include a bushing or fitting 126, such as a brass bushing or fitting or the like, for receiving a connector of a vacuum line connected to the vacuum source. Bushing 126 may be positioned within a body insert portion 130, which may comprise a substantially rigid material, such as a metallic material or the like, and which functions to provide structural rigidity to body portion 112 of vacuum cup 110.

Although shown and described as having a generally centrally located vacuum port, it is envisioned that the central opening in the vacuum cup body portion or insert portion may receive or include or incorporate an object sensor (such as shown in phantom at 128 in FIG. 5), such as a proximity sensor or double blank detection sensor or the like, such as the sensors of the types described in U.S. Pat. No. 4,662,668 and/or U.S. pat. application Ser. No. 10/931, 637, filed Sep. 1, 2004, which are hereby incorporated herein by reference. The object sensor may be operable to detect the presence of an object or item at the vacuum cup, or may detect the material thickness of an object or objects at the vacuum cup, without affecting the scope of the present invention. In such an application, a vacuum port (such as shown in phantom at 117 in FIG. 5) may be provided through the body portion of the vacuum cup and radially outward from the central opening.

In the illustrated embodiment, body portion 112, perimeter seal 114 and inner seal 124 are all integrally molded from a unitary elastomeric material. As can be seen in FIGS. 8 and 9, the elastomeric body portion 112 may be molded around the body insert 130, with body insert portion 130 optionally being insert molded within elastomeric body portion 112. Body portion 112 thus may comprise a structurally rigid central portion for vacuum cup 110, while the flexible perimeter seal portion 114 may extend radially outwardly from the central body portion 112.

Optionally, and with reference to FIG. 10, a relief port 122' of a vacuum cup 110' may comprise a body portion 123 and an inner seal or sealing member or valve 124' that define a passageway 122a' that is positioned within and through the body portion 112' and maybe through the body insert portion 130. The relief port body portion and inner seal may comprise a separate component and may be insert molded within the body portion or may be inserted into or attached to an already formed body portion, such as inserted into an opening or passageway formed through the body portion, or may otherwise be positioned at and through the body portion to provide a substantially sealable or closable passageway therethrough, without affecting the scope of the present invention. Optionally, the relief port may comprise a button valve or poppet valve or movable sealing member or the like positioned at least partially through the body portion and movable or operable or configurable to selectively open and close the passageway to at least partially relieve the vacuum from within the cavity. For example, the relief port may include a passageway through the body portion and a movable button seal or the like that may move to substantially close off or seal the passageway when the cup is moved into engagement with the object, and may move to open or at least partially open the passageway when the cup is moved at least partially away from the object. Other means for selectively sealing and opening the vacuum relief port may be implemented without affecting the scope of the present invention. The relief port thus may be integrally molded with the body portion, insert molded or otherwise positioned within or attached to or otherwise formed within or through or at least partially through the body portion. The inner seal or sealing member may comprise a flexible lip seal or the like or a movable sealing member or the like that is movable to open and close the relief port as the vacuum cup is moved relative to the object surface.

In the illustrated embodiment of FIGS. 5-9, perimeter seal portion 114 comprises a flexible flared seal or skirt that extends radially outward from body portion 112 and defines the sidewalls of the cavity 118. As can be seen with reference to FIGS. 8 and 9, the outer perimeter lip or edge 114a of perimeter seal 114 may engage a surface of an object 120 and may flex outwardly as vacuum cup 110 is moved into engagement with the object 120 to provide a substantially uniform and substantially airtight seal around the perimeter of the vacuum cup. As shown in FIG. 8, inner seal 124 of relief port 122 may be offset from the plane defined by perimeter lip 114a of perimeter seal 114 in its relaxed or uncompressed state, such that inner seal 124 may be spaced slightly from the surface of the object even while the perimeter lip 114a is engaged with and partially or substantially sealed against the object. This spacing allows the relief port to at least partially relieve the vacuum within the cavity before or while the perimeter seal and vacuum cup are stripped from the object, such as during the stripping process, as discussed below.

As can be seen in FIG. 9, when vacuum cup 110 is fully engaged and/or sealed with the object 120 (such as when the vacuum is applied to draw air out of the cavity and thus draw the body portion toward the object until the vacuum cup is fully seated against the object and one or more pads 132 of body portion 112 engage the surface of the object), inner seal 124 may substantially uniformly engage the surface of the object, and may flex or compress to substantially seal against the object to substantially seal or substantially close off passageway 122a of relief port 122, such that the vacuum or partial vacuum may be created within cavity 118 by the vacuum source. When vacuum cup 110 is engaged with the object 120, such as shown in FIG. 8, the vacuum source may be activated (or the partial vacuum may be otherwise applied to the vacuum cup) to pull or draw the vacuum cup into full engagement with the object (such as shown in FIG. 9) and to create a partial or substantial vacuum within cavity 118 to substantially retain and seal object 120 on vacuum cup 110, whereby vacuum cup 110 (or multiple vacuum cups) may lift the object and transport the object to a targeted location. Inner seal 124 may remain substantially sealed against the object such that the relief port is substantially closed off. The vacuum cup thus is substantially sealed to the object and provides the full lifting or holding force at the object without losing vacuum through the sealed relief port.

In the illustrated embodiment, the lip or flange of the inner seal 124 is curved or flexed or formed radially inward toward the center or axis of the passageway 122a. This form or curve of the inner seal is desired to assist in maintaining a substantial seal against the object surface when the vacuum cup is engaged with the object and when the vacuum is applied to draw air out of the cavity of the vacuum cup. When the vacuum is applied and the cavity is thus at a lower pressure than the surrounding atmosphere around the vacuum cup, the atmospheric pressure applies a pressure or force at the inner seal (such as in a generally downward direction in FIG. 9) that maintains the inner seal in substantial engagement with the object surface. If the inner seal were formed to have a flared outward shape that flared radially outward from the axis of the passageway, the atmospheric pressure, which would be greater than the pressure within the cavity, would tend to cause the lip or seal to partially disengage from the object surface and thus allow air to flow into the cavity (the area of lower pressure), and thus reduce the vacuum within the cavity. The inward curve or form of the inner seal of the present invention thus substantially closes the relief port passageway so that the vacuum cup has its full lifting or holding power throughout the transportation of the object.

When the vacuum cup and object are moved to the desired drop off location for the object, vacuum cup 110 may be pulled or moved in a direction generally away from object 120 (or the object may be pulled or moved in a direction generally away from the vacuum cup), such as in an upward direction in FIGS. 8 and 9. For example, the vacuum cup or cups may engage and lift and transport a metallic panel or object to an overhead magnetic conveyor, where the cups may be moved upward to engage the object with the magnetic conveyor. The vacuum cups may then be moved further upward away from the conveyor (which retains the object to resist/limit further upward movement of the object). Because the cup is substantially sealed against the object and the vacuum is thus substantially maintained within the cavity (and because the vacuum source may still be operational to create/maintain the partial vacuum in cavity 118), the perimeter seal 114 will resist movement of the vacuum cup away from object 120 due to the suction or forces exerted by the partial vacuum within the cavity 118.

Once vacuum cup 110 is pulled or moved a sufficient amount in a direction generally away from object 120 (as shown in FIG. 8), inner seal 124 may at least partially disengage from the surface of object 120, such as after only a slight initial movement of vacuum cup 110 away from the object 120. As the inner seal 124 disengages from the surface of object 120, relief port 122 allows air to flow into cavity 118 to partially relieve the vacuum and thus to reduce the force needed to pull or fully release vacuum cup 110 from object 120. The object may then be stripped from the vacuum cup or cups with reduced stress and wear occurring to the vacuum cups during the stripping process. The inner seal and relief port of the vacuum cup of the present invention thus provide an automatic vacuum relief port or valve to assist in releasing the vacuum cup from an object after an initial movement or pulling of the vacuum cup away from the object. The relief port reduces the vacuum level in the cup and thus eases the release of the vacuum cup from the object before or as the vacuum cup is stripped or substantially pulled or moved away from the object.

Accordingly, when the vacuum is applied and the inner seal is engaged with the object surface, the vacuum cup has its full holding or lifting power so that the object is substantially sealed to or held by the vacuum cup or cups of the material handling system. When the vacuum cup is moved or pulled a sufficient amount to break the inner seal free from the object surface to open the relief port or passageway, the vacuum within the cavity between the vacuum cup and the object is at least partially relieved or reduced, yet the vacuum cup is still substantially sealed or held or attached to the object via the partial or reduced vacuum and/or the perimeter seal of the vacuum cup. However, because the vacuum within the cavity is reduced or at least partially vented to atmosphere, the vacuum cup may be moved further away from the object and removed from the object with a reduced force. The vacuum cup thus may be removed or stripped from the object via a reduced force after an initial movement of the vacuum cup in a direction generally away from the object, even while the vacuum source may still be operational to create/maintain the partial vacuum within the cavity. Typically, the initial pulling or moving to disengage the inner seal from the object surface and the pulling or moving to strip or remove the object from the vacuum cup happens in a substantially continuous motion or process. The relief port thus reduces the stress and wear on the sidewalls of the vacuum or suction cup and perimeter seal of the cup as the cup is moved or pulled or disengaged from the object, with the forces required to remove the vacuum cup from the object being reduced during the stripping process and once the relief port is at least partially opened. The reduced stress and wear to the vacuum cup during the removal or stripping process provides an enhanced or longer life cycle for the vacuum cup.

Although shown in FIGS. 5-9 as a vacuum cup having a tapered perimeter seal portion, it is envisioned that other seal portions and/or other types of vacuum cups may be implemented with a vacuum cup in accordance with the present invention. For example, and with reference to FIGS. 11-13, a vacuum cup 210 may include a body portion 212 and a bellows style or accordion style perimeter seal 214. As best shown in FIG. 13, vacuum cup 210 may include a vacuum relief port 222 having a passageway 222*a* and an inner seal or sealing member or valve 224 for opening and closing passageway 222*a* of vacuum relief port 222 as inner seal 224 is spaced from or engaged with an object to be picked up and carried by vacuum cup 210. The length of the inner seal 224 and the spacing or gap from the end of the inner seal to the plane defined by the sealing lip 214*a* of seal 214 may vary depending on the appropriate or desired degree of flex and collapsing of the accordion style perimeter seal 214, without affecting the scope of the present invention. Vacuum cup 210 may otherwise be substantially similar to vacuum cup 110, discussed above, such that a detailed discussion of the vacuum cup will not be repeated herein. The common or similar components of the vacuum cups are shown in FIGS. 11-13 with 100 added to the reference numbers of FIGS. 5-9.

The relief port of the present invention thus may be substantially closed or sealed when the vacuum cup is substantially or fully sealed against the object surface. When sealed in this manner, the vacuum source may operate to draw the air out of the cavity of the vacuum cup to substantially seal the vacuum cup to the object surface. Because the inner seal of the relief port is spaced from the plane of the perimeter lip of the perimeter seal when the vacuum cup is first engaged with the object surface, it is preferred that the relief port or passageway have a diameter or volume flow capability that is smaller or less than the diameter or volume flow capability of the vacuum port or passageway. The air flow through the vacuum port thus will be greater than the air flow through the relief port, such that the vacuum source will be able to draw more air out of the cavity through the vacuum port than the air flowing into the cavity through the relief port. The vacuum source thus may draw air out of the vacuum cup cavity and thus may cause the vacuum cup to seal against the object surface and may cause the body portion of the vacuum cup and the inner seal of the relief port to move further toward the object surface until the vacuum cup is fully engaged with the object. Once the body portion has moved a sufficient amount so that the inner seal is engaged with and/or sealed against the object surface, the vacuum source may draw air out of the cavity without additional air flowing in through the relief port and thus may substantially seal the vacuum cup against the object to provide the full or appropriate or desired lifting or holding power to the vacuum cup.

Therefore, the present invention provides a vacuum cup that may substantially seal to a surface of an object and may be retained to the object via a vacuum created within a cavity defined between the vacuum cup and the object. The vacuum cup has its full holding power until pulled a sufficient amount to open the relief port or passageway, which at least partially relieves the vacuum from within the cavity between the vacuum cup and the object. Thus, when the vacuum cup is moved or pulled further away from the object, the vacuum cup may be removed from the object with a reduced force due to the reduced vacuum within the cavity of the vacuum cup. The vacuum cup thus may be removed or stripped from the object via a reduced force after an initial movement of the vacuum cup in a direction generally away from the object, even while the vacuum source may still be operational to create/maintain the partial vacuum within the cavity. The present invention thus provides an automatic vacuum relief port or valve to automatically relieve the vacuum within a vacuum cup to assist in releasing the vacuum cup from the object. The present invention thus provides reduced stress at the perimeter seals and/or sidewalls and the like of the vacuum cup and, thus, may provide for an enhanced life cycle of the vacuum cup.

Changes and modifications to the specifically described embodiments may be carried out without departing from the principles of the present invention, which is intended to be limited only by the scope of the appended claims as interpreted in accordance with the principles of patent law.

The embodiments of the invention in which an exclusive property is claimed are defined as follows:

1. A vacuum cup for a material handling system, said vacuum cup being adapted for engaging and picking up an object, said vacuum cup comprising:
   a body portion having a generally central axis;
   a flexible perimeter seal extending from said body portion and circumferentially around said generally central axis, said perimeter seal defining a first engaging plane at a first level when said vacuum cup is not engaged with an object, said perimeter seal engaging an object and substantially sealing to the object when said vacuum cup is engaged with the object, said vacuum cup being substantially retained against the object via a partial vacuum within a cavity defined between said body portion, said perimeter seal and the object;
   a relief port defined through one of said body portion and said flexible perimeter seal of said vacuum cup, said relief port being radially offset from said generally central axis of said body portion, said relief port having a sealing member, said sealing member defining a second engaging plane at a second level when said vacuum cup is not engaged with an object, said second level being above said first level and between said first level and said body portion;
   said vacuum cup being configured so that said sealing member at least substantially closes said relief port to limit airflow therethrough when said sealing member engages the object; and
   said sealing member at least partially disengaging from the object and at least partially opening said relief port when said vacuum cup is moved relative to the object and moved a sufficient amount in a direction generally away from the object and while said perimeter seal remains engaged with the object, said relief port at least partially relieving the partial vacuum in said cavity when said relief port is at least partially opened and while said perimeter seal is engaged with the object.

2. The vacuum cup of claim 1, wherein said vacuum cup is adapted to connect to a vacuum source that is operable to create the partial vacuum between said vacuum cup and the object when said perimeter seal is engaged with the object.

3. The vacuum cup of claim 2, wherein said vacuum cup includes a vacuum port formed through said body portion of said vacuum cup and through which the vacuum source draws air out of said cavity.

4. The vacuum cup of claim 3, wherein said vacuum port has a first diameter and said relief port has a second diameter, said first diameter being greater than said second diameter.

5. The vacuum cup of claim 1, wherein said perimeter seal comprises a radially outwardly flared lip, an outer perimeter edge of said outwardly flared lip engaging the object when said vacuum cup is engaged with the object.

6. The vacuum cup of claim 5, wherein said sealing member comprises a radially inwardly flared lip that curves inwardly toward a longitudinal axis of said relief port.

7. The vacuum cup of claim 1, wherein said perimeter seal is integrally molded with said body portion.

8. The vacuum cup of claim 1, wherein said body portion is molded around an insert portion.

9. The vacuum cup of claim 8, wherein said insert portion includes at least one of a vacuum source and an object sensor.

10. The vacuum cup of claim 1, wherein said relief port and said sealing member comprise one of (a) a relief port and sealing member integrally molded with said body portion, (b) a relief port body and sealing member insert molded within said body portion, (c) a relief port body and sealing member attached to said body portion, and (d) a relief port at least partially through said body portion and a movable sealing member movable to open and close the relief port.

11. The vacuum cup of claim 1, wherein said sealing member is integrally molded with said body portion.

12. The vacuum cup of claim 1, wherein said relief port is defined through a relief port body, said relief port body and said sealing member being insert molded within said body portion.

13. The vacuum cup of claim 1, wherein said body portion includes a plurality of pads extending therefrom, said pads being circumferentially arranged around said generally central axis and radially spaced therefrom, said pads limiting further compression of said vacuum cup against the object when said vacuum cup is fully engaged with the object.

14. The vacuum cup of claim 13, wherein said relief port is established generally at or near at least one of said pads.

15. The vacuum cup of claim 1, wherein said vacuum port has a vacuum opening at said cavity and said relief port has a relief opening at said cavity, said vacuum opening having a diameter that is greater than a diameter of said relief opening.

16. A material handling system for engaging and picking up objects and transporting the objects, said material handling system comprising:
   a vacuum source; and a vacuum cup for sealing to an object to pick up the object, said vacuum cup and the object defining a cavity therebetween when said vacuum cup is engaged with the object, said vacuum cup comprising:
  a body portion, said body portion being connected to said vacuum source, said body portion having a generally central axis;
  a flexible perimeter seal extending from said body portion and generally circumferentially around said generally central axis, said perimeter seal engaging the object and flexing and substantially sealing to the object when said vacuum cup is engaged with the object, said body portion and said perimeter seal defining said cavity at the object when said vacuum cup is engaged with the object;
  a vacuum port in fluid communication between said cavity and said vacuum source, said vacuum port being at or near said generally central axis; and
  a relief port defined through one of said body portion and said flexible seal, said relief port being radially offset from said generally central axis of said body portion, said relief port having a sealing member, said sealing member being at a level above said flexible perimeter seal when said vacuum cup is not engaged with an object so that said sealing member is disengagable from the object while said flexible perimeter seal is engaged with the object;
  said sealing member engaging the object and at least substantially closing said relief port to limit airflow therethrough when said vacuum cup is sufficiently engaged with the object, said vacuum source being operable to draw air through said vacuum port and out of said cavity to create a partial vacuum in said cavity when said perimeter seal and said sealing member are engaged with the object, said sealing member disengaging from the object and at least partially opening said relief port when said vacuum cup is moved a sufficient amount in a direction generally away from the object and while said perimeter seal is engaged with the object, said relief port at least partially relieving said vacuum in said cavity when said relief port is at least partially opened and while said perimeter seal is engaged with the object.

17. The material handling system of claim 16, wherein said vacuum cup is removable from the object while said vacuum source is on, said vacuum cup being removed after said sealing member is at least partially disengaged from the object.

18. The material handling system of claim 16, wherein said vacuum source draws air out of said cavity through said vacuum port formed through said body portion of said vacuum cup.

19. The material handling system of claim 18, wherein said vacuum port has a first diameter and said relief port has a second diameter, said first diameter being greater than said second diameter.

20. The material handling system of claim 16, wherein said sealing member flexes radially inward toward a longitudinal axis of said relief port when said sealing member engages the object.

21. The material handling system of claim 20, wherein said perimeter seal comprises a radially outwardly flared cup with an outer perimeter edge of said cup engaging the object.

22. The material handling system of claim 16, wherein said relief port and said sealing member comprise one of (a) a relief port and sealing member integrally molded with said body portion, (b) a relief port body and sealing member insert molded within said body portion, (c) a relief port body and sealing member attached to said body portion, and (d) a relief port at least partially through said body portion and a movable sealing member movable to open and close the relief port.

23. The material handling system of claim 16, wherein said sealing member is integrally molded with said body portion.

24. The material handling system of claim 16, wherein said relief port is defined through a relief port body, said relief port body and said sealing member being insert molded within said body portion.

25. The material handling system of claim 16, wherein said body portion includes a plurality of pads extending therefrom, said pads being circumferentially arranged around said generally central axis and radially spaced therefrom, said pads limiting further compression of said vacuum cup against the object when said vacuum cup is fully engaged with the object.

26. The material handling system of claim 25, wherein said relief port is established generally at or near at least one of said pads.

27. The material handling system of claim 16, wherein said vacuum port has a vacuum opening at said cavity and said relief port has a relief opening at said cavity, said vacuum opening having a diameter that is greater than a diameter of said relief opening.

28. A vacuum cup for a material handling system, said vacuum cup being adapted for engaging and picking up an object, said vacuum cup comprising:
  a body portion, said body portion having a generally central axis;
  a flexible perimeter seal extending from said body portion and defining a first engaging plane at a first level when said vacuum cup is not engaged with an object, said perimeter seal engaging an object and substantially sealing to the object when said vacuum cup is engaged with the object, said vacuum cup being substantially retained against the object via a partial vacuum within a cavity defined between said body portion, said perimeter seal and the object;
  said body portion having a plurality of pads extending from said body portion generally toward the object when said vacuum cup is engaged with the object, said pads being radially spaced from said generally central axis and spaced circumferentially around said generally central axis;
  a vacuum port formed through said body portion of said vacuum cup and through which a vacuum source draws air Out of said cavity;
  a relief port established through said body portion of said vacuum cup and between two of said pads, said relief port having a sealing member, said sealing member defining a second engaging plane at a second level when said vacuum cup is not engaged with an object, said second level being above said first level and between said first level and said body portion;
  wherein said pads engage the object to limit compression of said vacuum cup against the object when said vacuum cup is fully engaged with the object, said vacuum cup being configured so that said sealing member at least substantially closes said relief port to limit airflow therethrough when said sealing member engages the object and when said pads engage the object; and
  wherein said sealing member at least partially disengages from the object and at least partially opens said relief port when said vacuum cup is moved relative to the object and moved a sufficient amount in a direction generally away from the object and while said perimeter seal remains engaged with the object, said relief port at least partially relieving the partial vacuum in said cavity when said relief port is at least partially opened and while said perimeter seal is engaged with the object.

29. The vacuum cup of claim 28, wherein said vacuum port is spaced radially from said pads and said relief port.

30. The vacuum cup of claim 29, wherein said vacuum cup is at said generally central axis.

31. The vacuum cup of claim 28, wherein said vacuum port has a vacuum opening at said cavity and said relief port has a relief opening at said cavity, said vacuum opening having a diameter that is greater than a diameter of said relief opening.

* * * * *